F. C. W. TIMM.
PROCESS FOR THE RECOVERY OF ZINC OXIDE FROM ZINCIFEROUS MATERIALS, ESPECIALLY SLAGS.
APPLICATION FILED APR. 22, 1913.

1,409,318. Patented Mar. 14, 1922.

WITNESSES:
John C. Sanders
Albert F. Heuman

INVENTOR:
Friedrich Carl Wilhelm Timm
BY Mr. Nassau White
ATTY

UNITED STATES PATENT OFFICE.

FRIEDRICH CARL WILHELM TIMM, OF HAMBURG, GERMANY.

PROCESS FOR THE RECOVERY OF ZINC OXIDE FROM ZINCIFEROUS MATERIALS, ESPECIALLY SLAGS.

1,409,318.  Specification of Letters Patent.  Patented Mar. 14, 1922.

Application filed April 29, 1913. Serial No. 764,349.

(GRANTED UNDER THE PROVISIONS OF THE ACT OF MARCH 3, 1921, 41 STAT. L., 1313.)

*To all whom it may concern:*

Be it known that I, FRIEDRICH CARL WILHELM TIMM, a subject of the Emperor of Germany, residing at Hamburg, Germany, have invented new and useful Improvements in Processes for the Recovery of Zinc Oxide from Zinciferous Materials, Especially Slags, of which the following is a specification.

This invention relates to a process for the separation of zinc from zinciferous materials which are either easily melted by themselves, as for example the slags from lead and copper furnaces, or may be obtained in a molten condition by the addition of suitable fluxes. The separated zinc is recovered in the form of zinc oxide. The zinc may be contained in the materials in the form of oxide, silicate, sulphide or other combination.

Figure 1:
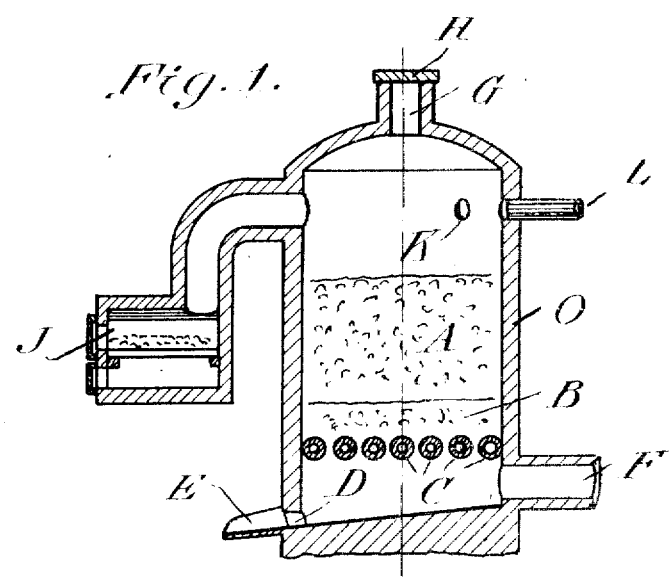
Figure 2:
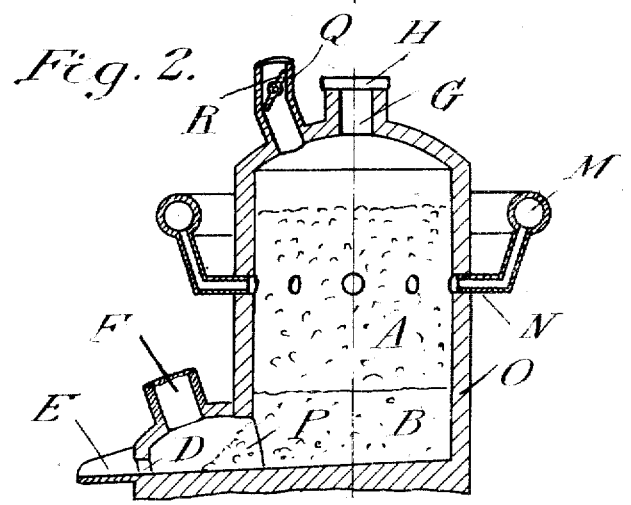

In the accompanying drawing Figures 1 and 2 illustrate in vertical section two furnaces suitable for working the process, similar letters of reference relating to like parts therein.

In Figure 1, O is a blast furnace to which the charge is introduced through the opening G. The opening G is covered by a plate H which is taken off on introducing the charge. On a grate of water-cooled pipes C rests the dezincifying layer B and on this the charge A which contains the materials to be dezincified. At the side of the furnace O is provided a furnace grate J the hot gases of combustion from which enter the furnace at the top and pass downwards through the grate, whereupon they escape through the conduit F, and pass into the cooling apparatus and filter sprays. Through the grate also flows the molten and dezincified residue which passes out of the furnace through the openings D and is introduced into slag moulds by means of a spout E in the familiar manner.

If it is desired to fire with gas instead of with a furnace grate, gas is admitted through the opening K and is burned by means of air which enters through the pipe L.

The furnace shown in Figure 2 is quite similarly constituted, but in it, the heat necessary is produced in the charge itself by the combustion of coke or coal. For this purpose the air for combustion enters the charge from the main air channel M through the nozzles N. The coke burns in front of the nozzles and the damper R in the eduction pipe Q is so adjusted that part of the gases escapes upwards through Q, and the other part escapes downwards through conduit F. In this case the dezincifying layer does not rest on a grate but directly on the floor of the furnace so that the gases and the dezincified molten residue pass out through the opening P. The molten residue then passes on through the opening D to the spout E.

The process inter alia aims at making materials available, which on account of their easy fusibility and of their small zinc content, do not allow of treatment with economical results by any of the methods hitherto known. This is rendered possible by producing a liquid residue and by attaining a high yield of zinc at a comparatively slight cost.

In the present process the materials are fed to the furnace in pieces of any desired size as regards the lower limit, either in a cold or in a heated condition. Nevertheless with previous heating the temperature is not carried so high that the zinciferous materials enter the furnace in the form of liquid slag.

The process consists in melting the zinciferous materials in a blast furnace on a layer of such materials as cause or facilitate the liberation of zinc, for example, carbon, lime, iron, the melting being effected by heating gases which traverse the zinciferous materials and the materials in the lower layer in a downward direction. In what follows this lower layer is designated the "dezincing layer" and the materials composing the same are referred to as de-zincing materials. The de-zincing layer may rest on a grate which consists preferably of water-cooled pipes or the like.

The following among others are known as materials which cause or facilitate the liberation of zinc-carbon, lime, lime compounds, iron, and compounds of iron and oxygen. Several of such materials may be employed simultaneously, the composition of the dezincing layer being so adapted to that of the zinciferous materials that a slag as poor as possible in zinc flows away. Indirectly additions of silica, alumina, fluorspar and other materials also facilitate the liberation of zinc according to circumstances, by causing an easily fusible slag.

The fragmentary materials are melted by the hot gases traversing them and then drip through the de-zincing layer. Here they have the opportunity of giving off zinc by reduction or reaction in passing. The flame however is maintained as far as possible in so oxidizing a condition that the zinc vapour is converted to zinc oxide immediately it is produced. By these means the heat necessary for the actual reduction becomes practically nil, for the heat used for reduction is immediately again restored at the same place by oxidation. A further result of the oxidizing character of the flame is the prevention of the separation of iron which would otherwise occur in the case of most materials treated.

The process may be carried on uninterruptedly by supplying, in suitable proportion with the zinciferous material, these materials which are removed from the de-zincing layer by the molten substance flowing through it. It is true that in that case there occurs, even above the de-zincing layer, a melting and a reaction connected therewith between the zinciferous materials and the materials which afterwards collect in the de-zincing layer, zinc and zinc-oxide being evolved. The latter occurrence is the same as was described in the patent specification accompanying my application for Patent Serial No. 751886 filed on the 3rd March, 1913.

The present process is to be regarded as an improvement on that last mentioned for the reason that by its means even that zinc is recovered which enters the de-zincing layer and is there liberated, for in the other process the grate plays approximately the same part as the upper surface of the de-zincing layer in this. Owing to the fact that in the present process the charge may be deposited in a comparatively thin layer without thereby causing a residue rich in zinc, a flame of a more strongly oxidizing character may be maintained whereby, in addition to the advantages mentioned, the fuel consumption is reduced.

The furnace serving to carry on the process may be designated a blast furnace. Preferably those methods of construction are employed which were described in the patent specification No. 751886 of 3rd March, 1913 hereinbefore referred to. The method of working is only altered in accordance with the present process in that a de-zincing layer of sufficient thickness is maintined on the grate. If for example zinc is to be recovered from slag from lead furnaces, this may mostly be attained in sufficient degree by using coke and lime alone as materials for the de-zincing layer.

The heating and melting of the fragmentary materials resting on the de-zincing layer may be effected, for example, by the hot gases of a lateral fire which play on to the top of the charge, or by the combustion of producer gas in the space above the charge or in it, or by pulverulent or liquid fuel preferably introduced from above simultaneously with air, or by fragmentary fuel supplied together with the zinciferous materials.

The employment of pulverulent fuel has the special advantage that coal or breeze of little value can be used and that at the same time pieces of coke supplied for reduction can be saved without materially influencing the yield. Then as regards the reducing action, the less finely ground particles of the pulverulent fuel fulfil the same task as the fragmentary coke, for these coarser particles are carried along by the stream of gas and settle in the liquid slag. In this manner it is possible for example to treat slag from lead furnaces by the present process with lime only as the de-zincing layer.

Moreover it is also possible to blow in air, alone or in combination with suitable fuel, laterally from the circumference of the blast furnace into the charge through tuyeres. With fuel supplied in pieces the process may also in this case be worked in such a way that a small portion of the gases are allowed to go upwards but the rest downwards. Then the fuel burns in front of the tuyeres and the gases in the downwardly travelling portion meet with approximately the same conditions as when air or gases are introduced exclusively from the upper surface. On the other hand the upwardly travelling portion gives up its heat under more favorable conditions on account of the opposed direction of flow. In this manner the charge reaches the melting zone with a high temperature and needs less heat and fuel there than with the exclusive use of the parallel direction of flow, whereby again the character of the gases becomes more strongly oxidizing. For other purposes and other processes the combustion of fragmentary fuel in smelting furnaces by means of air admitted laterally and travelling downwards only is in itself known.

The hot gases laden with zinc oxide passing out of the de-zincing layer may with advantage be employed for pre-heating the raw materials, heating air, or for other purposes, before being freed from zinc oxide by one of the known methods. Sometimes it may be preferable to add air to the gases after they leave the furnace, for the combustion of any carbon monoxide that may be present.

The de-zincing layer may be arranged on a blast furnace floor impervious to gas, instead of on a grate, be it a level, inclined, or basket grate, and the gases as well as the slag may be led out of the de-zincing layer by means of lateral openings.

If it is not desired to recover zinc oxide as such but as zinc compound, this can under certain circumstances be effected without previous separation of the zinc oxide from the stream of gas, for example by introducing the gases into acid water for the production of sulphate of zinc (zinc vitriol).

Fine grained materials such as fine ores, slimes, residue of zinc retorts, and the like, are preferably first briquetted, when the materials added may at the same time be intimately mixed and united with them.

It has already been proposed to effect the liberation of zinc from slag introduced into the furnace in a liquid condition by passing it through coke kept continuously red hot by blowing. Here on the contrary it is a case of materials introduced in pieces, and in addition the heating of the de-zincing layer is effected in a fundamentally different manner. If, for example, coke alone is employed in the present process as the material for the liberation of zinc, and if this is also used for melting by means of air blown in from above, then the combustion to carbon dioxide is effected in the charge of fragmentary material at its upper surface first whereby most of the coke is burned. At this point is produced the highest temperature, which diminishes further downwards when the reduction to carbon monoxide sets in, a corresponding quantity of heat becoming latent. Consequently in the de-zincing layer lying still deeper, no heat is evolved but the temperature is only kept up. Further, owing to the good state of division of the dripping liquid slag, the de-zincing layer only need have a small depth as compared with that for the process mentioned, with slag introduced in a liquid condition. This again causes a small formation of carbon monoxide and hence a saving of fuel. The advantages mentioned are the result of blowing in a downward direction in combination with the de-zincing layer, in which lies a further distinctive characteristic.

Further, it has already been proposed to liberate zinc from ores mixed with bituminous coal upon a layer of coal resting on a grate, by means of a downwardly directed stream of air, and to recover the zinc in the form of zinc oxide. But in that case the ore was not intended to be melted; so that the residue freed from zinc remained behind on the grate in the form of a sintered mass, that is to say, only imperfectly fused. By this older process therefore, for example, no zinciferous slags from lead furnaces can be treated, but only ores which melt with difficulty.

As opposed to this, the present process consists not only in the sintering of the zinciferous materials but in their complete melting; therefore for example, to ores which melt with difficulty and the like, fluxes are added or such materials as allow the ore to take the form of liquid slag at the temperature of the furnace and this flows through the de-zincing layer.

The maintenance of a special de-zincing layer also differentiates this invention from that of the patent specification No. 751886 of 3rd March, 1913 hereinbefore referred to in which the zinciferous materials are likewise melted. Only by the maintenance of the de-zincing layer is it possible to arrive at a very small zinc content for the molten residue, so that with good and careful work this may be described as practically free from zinc.

Claims.

1. Process for the recovery of zinc oxide from zinciferous materials, which consists in arranging zinciferous materials on a layer of de-zincing materials, in melting the zinciferous materials by means of hot combustion gases passing in a downward direction, in passing the molten mass and the gases through said layer, and in withdrawing the molten residue and the gases laden with zinc oxide at the lower side of said layers.

2. Process for the recovery of zinc oxide from slags containing zinc—especially lead and copper furnace slags—which consists in arranging the zinciferous materials on a layer of de-zincing materials, in melting the zinciferous materials by means of hot combustion gases passing in a downward direction, in passing the molten mass and the gases through said layer and in withdrawing the molten residue and the gases laden with zinc oxide at the lower side of said layers, the de-zincing layer being renewed by supplying in suitable proportion with the zinciferous material those substances removed from the said layer by the molten mass flowing through.

3. Process for the recovery of zinc oxide from zinciferous materials which consists in arranging zinciferous materials on a layer of de-zincing materials, in melting the zinciferous materials by means of hot combustion gases passing in a downward direction, such combustion gases being produced internally within the charge and only a part of the gases produced being passed downwards, the rest passing upwards, thereby preheating the charge on its way to the smelting zone.

In testimony whereof I have signed my name to this specification in the presence of two subscribing witnesses.

FRIEDRICH CARL WILHELM TIMM.

Witnesses:
ERNEST H. L. MUMMENHOFF,
IDA CHRIST HAFERMANN.